United States Patent
Schroers et al.

(10) Patent No.: US 12,278,969 B2
(45) Date of Patent: Apr. 15, 2025

(54) CODEC RATE DISTORTION COMPENSATING DOWNSAMPLER

(71) Applicants: Disney Enterprises, Inc., Burbank, CA (US); ETH Zurich (EIDGENÖSSISCHE TECHNISCHE HOCHSCHULE ZURICH), Zürich (CH)

(72) Inventors: Christopher Richard Schroers, Uster (CH); Roberto Gerson de Albuquerque Azevedo, Zurich (CH); Nicholas David Gregory, Zurich (CH); Yuanyi Xue, Alameda, CA (US); Scott Labrozzi, Cary, NC (US); Abdelaziz Djelouah, Zurich (CH)

(73) Assignees: Disney Enterprises, Inc., Burbank, CA (US); ETH Zurich (Eidgenossische Technische Hochschule Zurich), Zurich (CH)

( * ) Notice: Subject to any disclaimer, the term of this patent is extended or adjusted under 35 U.S.C. 154(b) by 0 days.

(21) Appl. No.: 18/230,409

(22) Filed: Aug. 4, 2023

(65) Prior Publication Data
US 2023/0379475 A1 Nov. 23, 2023

Related U.S. Application Data

(63) Continuation of application No. 17/500,373, filed on Oct. 13, 2021, now Pat. No. 11,765,360.

(51) Int. Cl.
*H04N 19/147* (2014.01)
*G06N 3/08* (2023.01)
*G06T 3/4046* (2024.01)
*G06T 9/00* (2006.01)
*H04N 19/132* (2014.01)
*H04N 19/184* (2014.01)

(52) U.S. Cl.
CPC ............. *H04N 19/147* (2014.11); *G06N 3/08* (2013.01); *G06T 3/4046* (2013.01); *G06T 9/002* (2013.01); *H04N 19/132* (2014.11); *H04N 19/184* (2014.11)

(58) Field of Classification Search
CPC .. H04N 19/147; H04N 19/132; H04N 19/184; G06N 3/08; G06T 3/4046; G06T 9/002
See application file for complete search history.

(56) References Cited

U.S. PATENT DOCUMENTS

| | | | |
|---|---|---|---|
| 2019/0075301 A1* | 3/2019 | Chou | H04N 19/132 |
| 2022/0198607 A1* | 6/2022 | Chen | G06N 3/045 |

* cited by examiner

*Primary Examiner* — Hesham K Abouzahra
(74) *Attorney, Agent, or Firm* — Farjami & Farjami LLP

(57) ABSTRACT

A system includes a machine learning (ML) model-based video downsampler configured to receive an input video sequence having a first display resolution, and to map the input video sequence to a lower resolution video sequence having a second display resolution lower than the first display resolution. The system also includes a neural network-based (NN-based) proxy video codec configured to transform the lower resolution video sequence into a decoded proxy bitstream. In addition, the system includes an upsampler configured to produce an output video sequence using the decoded proxy bitstream.

18 Claims, 6 Drawing Sheets

CODEC RATE DISTORTION COMPENSATING DOWNSAMPLER

The present application is a Continuation of U.S. application Ser. No. 17/500,373, filed Oct. 13, 2021, which is hereby incorporated by reference in its entirety into the present application.

BACKGROUND

Downsampling is an operation in content streaming systems to produce different representations in terms of bit rate and resolution available to different types of client devices. In modern streaming systems, the streaming server provides different encoding representations in terms of resolutions and bitrates, so that the client device can dynamically download the representation that best matches its playback context (e.g., display size and network conditions). In order to provide such representations, the streaming server needs to downsample the source video to different resolutions before encoding. That downsampling may be performed with filters that are not perceptually optimal.

DETAILED DESCRIPTION

Figure 1:
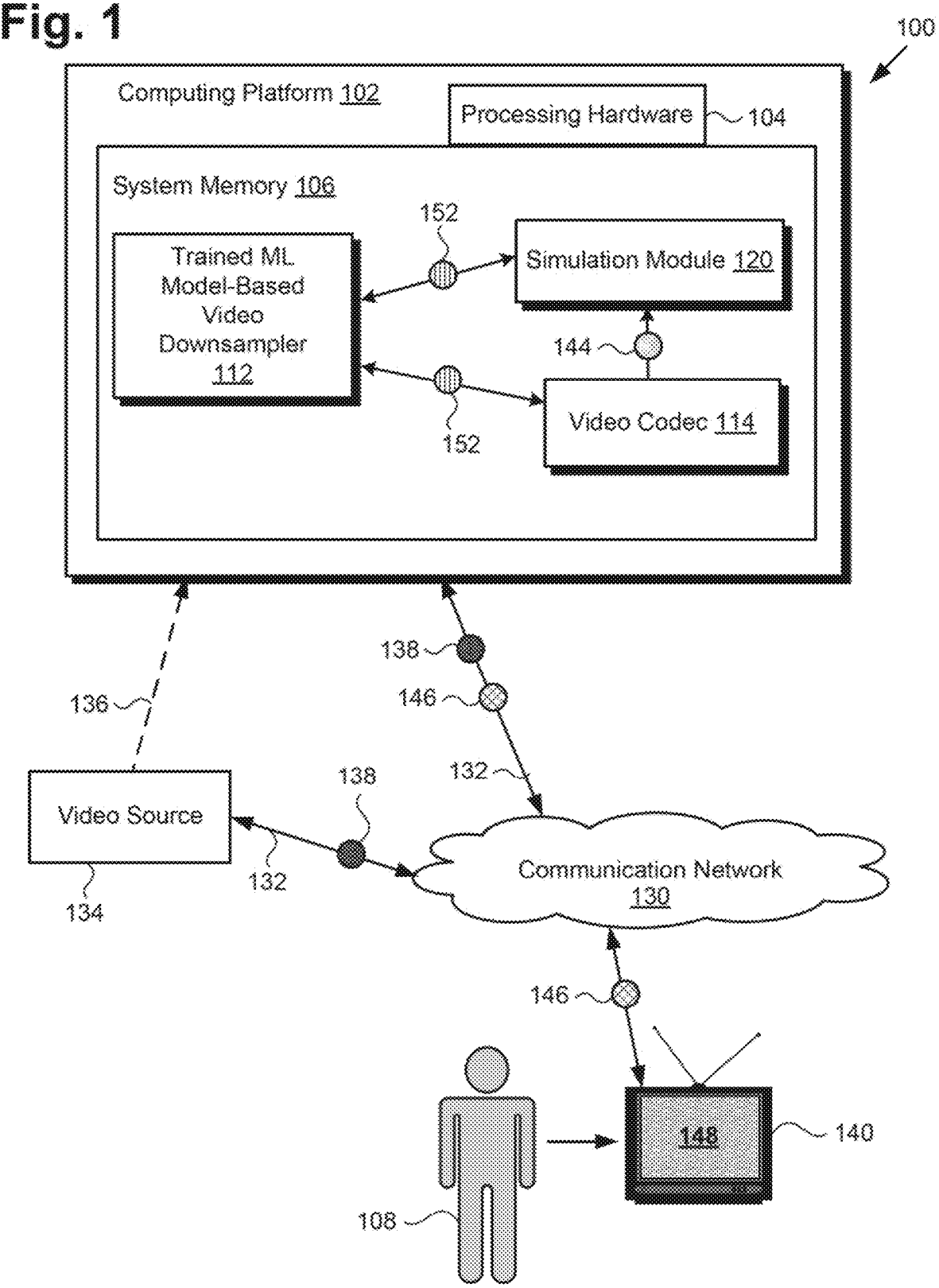
FIG. 1 shows a diagram of an exemplary video processing system including a trained machine learning (ML) model-based codec rate distortion compensating downsampler, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for training and utilizing a machine learning (ML) model-based codec rate distortion compensating downsampler that overcome the drawbacks and deficiencies in the art. Filters such as bilinear, cubic, or Lanczos filters are not perceptually optimal, and do not take into account that the source content will be encoded after downsampling. To that end, the present application discloses a perceptually-optimized approach to downsampling that includes 1) a learned downsampler, 2) a proxy video codec that emulates a standard-compatible image or video codec, 3) a temporally-aware perceptual loss function, 4) a conditioning mechanism allowing inference-time interpolation between different loss functions, and 5) a mechanism for arbitrary scaling. The downsampling solutions disclosed in the present application are applied only to the source content. Consequently, those solutions are compatible with existing image or video coding pipelines and do not require any change on the client side, while providing improved rate distortion performance in terms of perceptually aware quality metrics. Moreover, in some implementations, the present codec rate distortion compensating downsampling solution can be implemented as an automated process.

It is noted that, as defined in the present application, the terms "automation." "automated," and "automating" refer to systems and processes that do not require the participation of a human user, such as a human editor or system administrator. For example, although in some implementations a human system administrator may review the performance of the systems and methods disclosed herein, or, in the case of conditional downsampling discussed below, may provide user-defined perceptual loss function weights, that human involvement is optional. Thus, in some implementations, the processes described in the present application may be performed under the control of hardware processing components of the disclosed systems.

It is further noted that, as defined in the present application, the expression "machine learning model" or "ML model" may refer to a mathematical model for making future predictions based on patterns learned from samples of data or "training data." Various is learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network." in the context of deep learning, may refer to an NN that utilizes multiple hidden layers between input and output layers, which may allow for learning based on features not explicitly defined in raw data. In various implementations. NNs may be trained as classifiers and may be utilized to perform image processing or natural-language processing.

It is also noted that, as defined in the present application, the feature "proxy video codec" refers to an NN-based or other ML model-based software module that has been pre-trained to replicate the rate distortion characteristics of a standard codec, such as H.264 or AV1, for example. By contrast, existing deep learning-based codecs are not trained to replicate the distortion characteristics of standard codecs. As a result, the downsampling artifacts introduced by existing deep learning-based codecs, are very different from those produced by standard codecs and replicated by the proxy video codec disclosed herein. That is to say, by introducing a knowledge distillation-based proxy video codec that aims to reproduce the output of a traditional image/video codec, the approach disclosed in the present application advantageously facilitates optimization of downsampler performance for the actual distortions that are produced by standard codecs.

FIG. 1 shows a diagram of exemplary video processing system 100 including trained ML model-based codec rate distortion compensating video downsampler 112 (hereinafter "ML model-based video downsampler 112"), according to one implementation. As shown in FIG. 1, video processing system 100 includes computing platform 102 having processing hardware 104 and system memory 106 implemented as a computer-readable non-transitory storage medium. According to the present exemplary implementation, system memory 106 stores trained ML model-based video downsampler 112, video codec 114, and simulation module 120.

As further shown in FIG. 1, video processing system 100 is implemented within a use environment including video source 134 providing video sequence 138 (hereinafter "input video sequence 138"), communication network 130, and media content consumer 108 utilizing client device 140 including display 148. In addition. FIG. 1 shows network communication links 132 communicatively coupling video source 134 and client device 140 with video processing system 100 via communication network 130. Also shown in FIG. 1 is lower resolution video sequence 152, as well as decoded bitstream 146 corresponding to input video sequence 138.

It is noted that although video processing system 100 may receive input video sequence 138 from video source 134 via communication network 130 and network communication links 132, in some implementations, video source 134 may take the form of a content source integrated with computing platform 102, or may be in direct communication with video processing system 100, as shown by dashed communication link 136. It is further noted that, in some implementations, video processing system 100 may omit simulation module 120. Thus, in some implementations, system memory 106 may store trained ML model-based video downsampler 112 and video codec 114, but not simulation module 120.

Input video sequence 138 may include audio-video (AV) content in the form of a video game, a movie, or episodic programming content including streamed episodic content or broadcasted episodic content, for example. Input video sequence 138 may include a high-definition (HD) or ultra-HD (UHD) baseband video signal with embedded audio, captions, timecode, and other ancillary metadata, such as ratings and parental guidelines. In some implementations, input video sequence 138 may be provided by video source 134, such as a TV broadcast network or other media distribution entity (e.g., a movie studio, a streaming platform, etc.), utilizing secondary audio programming (SAP) or Descriptive Video Service (DVS), for example.

With respect to the representation of video processing system 100 shown in FIG. 1, it is noted that although trained ML model-based video downsampler 112, video codec 114, and simulation module 120 are depicted as being stored in system memory 106 for conceptual clarity, more generally, system memory 106 may take the form of any computer-readable non-transitory storage medium. The expression "computer-readable non-transitory storage medium." as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

It is further noted that although FIG. 1 depicts trained ML model-based video downsampler 112, video codec 114, and simulation module 120 as being mutually co-located in system memory 106, that representation is also merely provided as an aid to conceptual clarity. More generally, video processing system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within video processing system 100. Thus, it is to be understood that trained ML model-based video downsampler 112, video codec 114, and simulation module 120 may be stored remotely from one another within the distributed memory resources of video processing system 100. Moreover, and as noted above, in some implementations simulation module 120 may be omitted from system memory 106.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, video processing system 100 may be implemented virtually, such as in a data center. For example, in some implementations, video processing system 100 may be implemented in software, or as virtual machines.

Although client device 140 is shown as a smart TV in FIG. 1, that representation is provided merely as an example. More generally, client device 140 may be any suitable mobile or stationary computing device or system that implements data processing capabilities sufficient to provide a user interface, support connections to communication network 130, and implement the functionality ascribed to client device 140 herein. For example, in some implementations, client device 140 may take the form of a desktop computer, laptop computer, tablet computer, smartphone, digital media player, game platform, or a smart wearable device, such as a smartwatch, for example.

With respect to display 148 of client device 140, display 148 may be physically to integrated with client device 140 or may be communicatively coupled to but physically separate from client device 140. For example, where client device 140 is implemented as a smart TV, smartphone, laptop computer, tablet computer, or smartwatch, display 148 may be integrated with client device 140. By contrast, where client device 140 is implemented as a desktop computer or game platform, display 148 may take the form of a monitor separate from client device 140 in the form of a computer tower or game console, respectively. Moreover, display 148 may be implemented as a liquid crystal display (LCD), light-emitting diode (LED) display, organic light-emitting diode (OLED) display, quantum dot (QD) display, or any other suitable display screen that performs a physical transformation of signals to light.

By way of overview of the runtime or inference time performance of video processing system 100, it is noted that processing hardware 104 of computing platform 102 may receive input video sequence 138 having a first display resolution, and may map, using trained ML model-based video downsampler 112, input video sequence 138 to lower resolution video sequence 152 having a second display resolution lower than the first display resolution. Trained ML model-based video downsampler 112 is trained using an NN-based proxy video codec (not shown in FIG. 1) that has been pre-trained to replicate the rate distortion characteristics of video codec 114, in the form of a standard video codec.

Due to that training of trained ML model-based video downsampler 112, the downsampling of input video sequence 138 performed by ML model-based video downsampler 112 results in lower resolution video sequence 152 being substantially optimized for processing by video codec 114. Processing hardware 140 may then transform, using video codec 114, lower resolution video sequence 152 into decoded bitstream 146, and may output decoded bitstream 146. For example, as shown in FIG. 1, in some implementations, video processing system 100 may output decoded bitstream 146 to client device 140, via communication network 130 and network communication links 132, for display to media content consumer 108 on display 148 as an output video sequence corresponding to input video sequence 138.

Figure 2:
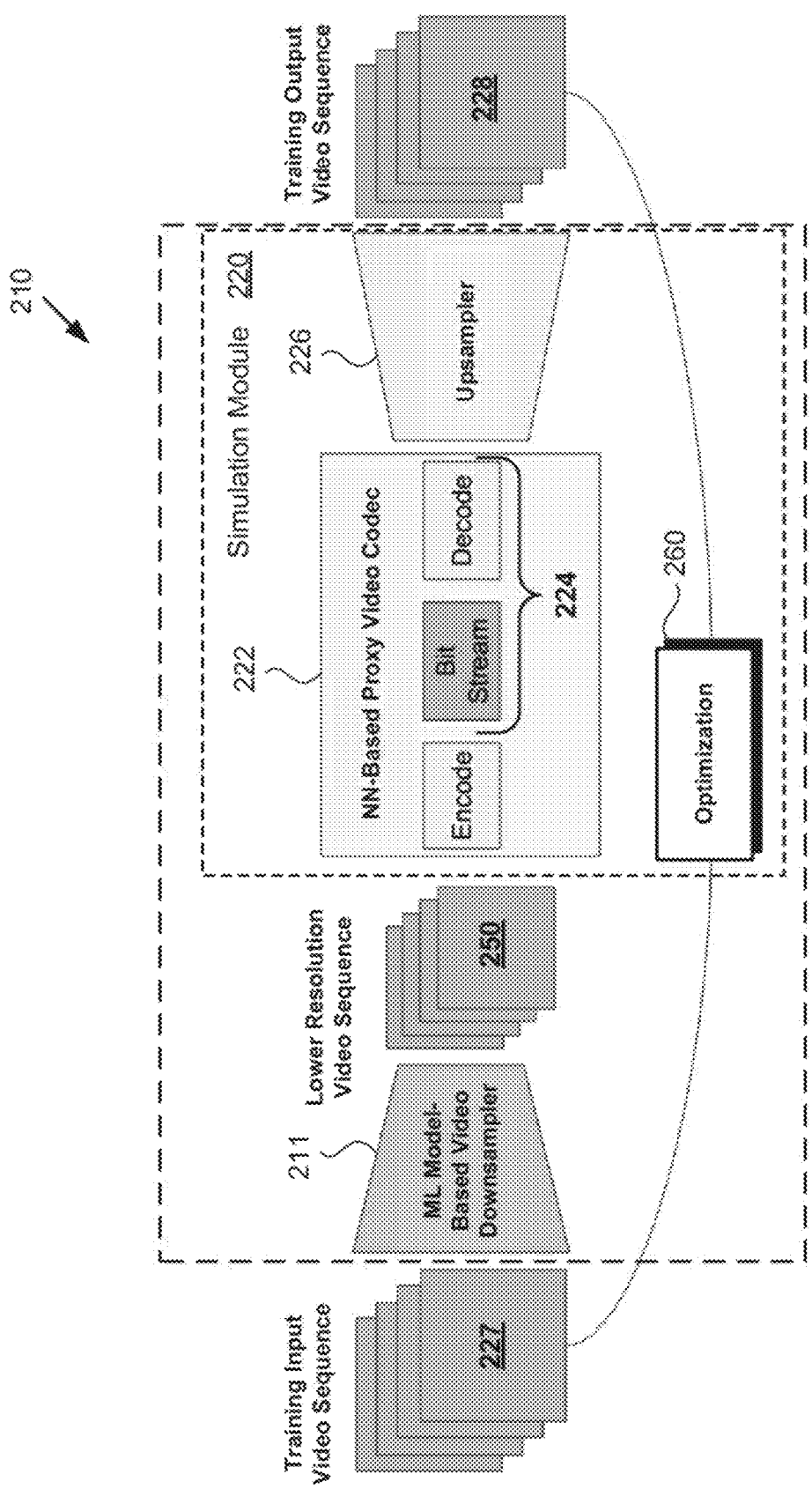
FIG. 2 shows a diagram of a training pipeline system for training the ML model-based codec rate distortion compensating downsampler shown in FIG. 1, according to one implementation.

FIG. 2 shows a diagram of training pipeline system 210 for training trained ML model-based video downsampler 112, in FIG. 1, according to one implementation. As shown in FIG. 2, training pipeline system 210 includes ML model-based video downsampler 211, simulation module 220 including NN-based proxy video codec 222, upsampler 226, and optimization block 260. Also shown in FIG. 2 are training input video sequence 227, lower resolution video sequence 250 downsampled from training input video sequence 227, decoded proxy bitstream 224 output by NN-based proxy video codec 222, and training output video sequence 228 corresponding to training input video sequence 227.

ML model-based video downsampler 211 corresponds in general to trained ML model-based video downsampler 112, in FIG. 1, prior to training of trained ML model-based video downsampler 112 using training pipeline system 210. Consequently. ML model-based video downsampler 211 may share any of the architectural characteristics attributed to trained ML model-based video downsampler 112 by the present disclosure, and vice versa. In addition, simulation module 220, in FIG. 2, corresponds in general to simulation module 120, in FIG. 1. Consequently, simulation module 120 may share any of the characteristics attributed to simulation module 220 by the present disclosure, and vice versa. That is to say, simulation module 120 may include features corresponding respectively to one or more of NN-based proxy video codec 222, upsampler 226, and optimization block 260.

Thus, training pipeline system 210 includes ML model-based video downsampler 211 configured to receive training input video sequence 227 having a first display resolution, and to map training input video sequence 227 to lower resolution video sequence 252 having a second display resolution lower than the first display resolution. In addition, training pipeline system 210 also includes NN-based proxy codec 222 configured to transform lower resolution video sequence 250 into decoded proxy bitstream 224, as well as upsampler 226 configured to receive decoded proxy bitstream 224 and produce output training video sequence 228 corresponding to input training video sequence 227 and having a display resolution higher than the second resolution.

Referring to training pipeline system 210, given a high-resolution input video sequence having L frames:

$$\mathcal{V}_{hr} = \{\mathcal{F}_l^{hr}\}_{l=1}^{L} \quad \text{(Equation 1)}$$

and a target downsampling scale 0<s<1, trained ML model-based video downsampler 112, herein symbolized by "$\mathcal{D}$," performs the operation that produces the downsampled version:

$$\mathcal{V}_{lr} = \{\mathcal{F}_l^{lr}\}_{l=1}^{L}. \quad \text{(Equation 2)}$$

Thus:

$$\mathcal{V}_{lr} = \mathcal{D}(\mathcal{V}_{hr}, s)). \quad \text{(Equation 3)}$$

Figure 3:
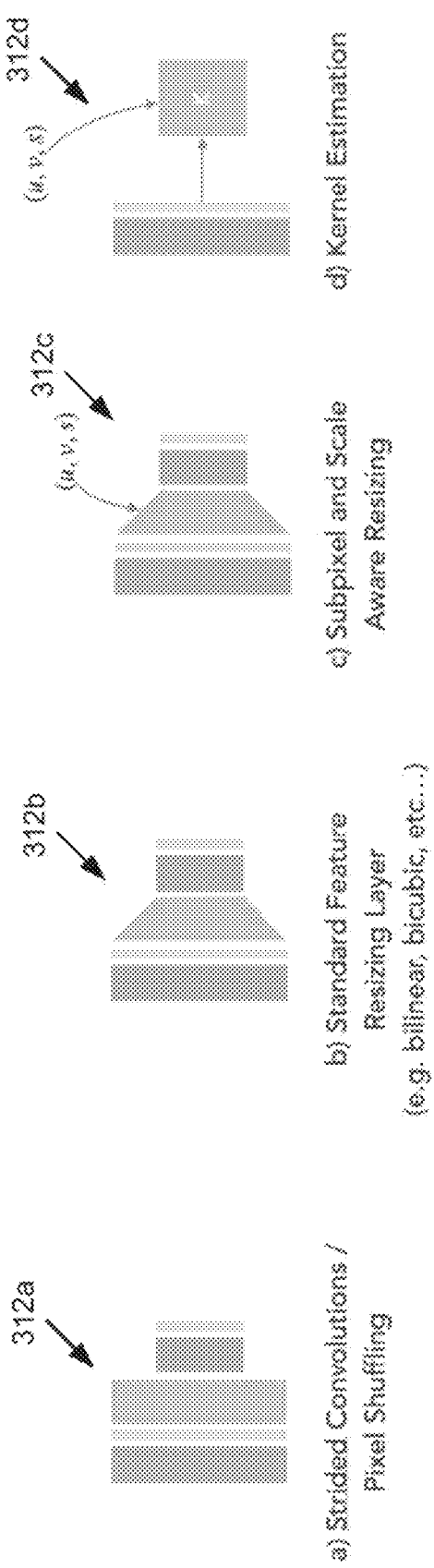
FIG. 3 depicts alternative exemplary architectures for the ML model-based codec rate distortion compensating downsampler shown in FIG. 1, according to various implementations.

Trained ML model-based video downsampler $\mathcal{D}$ can be implemented using different learning strategies. For instance, a possible instantiation of $\mathcal{D}$ can include a feature extraction module, followed by a downsampling module and another filtering or refinement module at the end that predicts either the downsampled result, the residual to a fixed downsampling, or kernels that allow sampling of the desired lower resolution result. To this end. FIG. 3 shows four alternative implementations of ML model-based video downsampler architectures suitable for adoption by ML model-based video downsampler 211 or trained ML model-based video downsampler 112 that use convolutional neural networks (CNNs) to realize downsampling of features extracted from the convolutional layers in different ways.

For example, referring to FIG. 3, ML model-based video downsampler architecture 312a uses strided convolutions, while ML model-based video downsampler architecture 312b features resampling with traditional filters such as linear, bicubic, or Lanczos filters, for example. ML model-based video downsampler architecture 312c is similar to ML model-based video downsampler architecture 312b but additionally uses accurate subpixel offsets and scale information as extra inputs into the convolutional layers. ML model-based video downsampler architecture 312d is designed to predict subpixel-aware kernels that can then be applied to the original $\mathcal{V}_{hr}$ to generate $\mathcal{V}_{lr}$. Given the nature of strided convolutions, ML model-based video downsampler architecture 312a supports only integer downsampling or downscaling factors, whereas ML model-based video downsampler architectures 312b, 312c, and 312d can also advantageously support arbitrary scaling factors. Thus, in various implementations, trained ML model-based video downsampler 112 may include a CNN. Moreover, in some implementations, trained ML model-based video downsampler 112 may advantageously be configured to support arbitrary, i.e., non-integer as well as integer, scaling factors.

For video based downsampling, the temporal correlation between the frames is also considered, and perceptually correct loss functions are employed, as described in greater detail below. However, it is readily understood that when L=1 trained ML model-based video downsampler 112 reduces to the case of an image-only downsampler that operates on single frame inputs. With L>1, the downsampler input is a sequence of video frames and exemplary training pipeline system 210 in FIG. 2 may utilize two-dimensional (2D) or three-dimensional (3D) convolutions, thereby taking account of the temporal frame sequence information during downsampling.

NN-Based Proxy Video Codec 222:

One challenge when end-to-end training ML model-based video downsampler 211 is that current compression standards are based on complex heuristics decisions and thus, are non-differentiable. To address and overcome this limitation, the present application discloses a novel and inventive knowledge distillation approach based on NN-based proxy video codec 222, herein symbolized by $\mathcal{P}$. NN-based proxy video codec 222 is pre-trained with data generated from a specific video codec of a specific standard (e.g., H.264, HEVC/H.265. MPEG-4, or AV1) to predict the rate-distortion characteristics of the specific standard video codec in a differentiable way. That is to say, NN-based proxy video codec 222 is pre-trained to replicate the rate distortion characteristics of the standard video codec, which may be unique to that specific standard video codec. Moreover. NN-based proxy video codec 222 is advantageously differentiable.

During pre-training, the learning objective of NN-based proxy video codec 222. $\mathcal{P}$, is to learn to predict the artefacts that a standard video codec would produce. $\mathcal{P}$ receives a video $\mathcal{V}$ and outputs both the distorted video $\mathcal{V}$ and its estimated rate $\mathcal{R}(\mathcal{V})$ according to a specific codec. Rather than training only for a specific target rate, NN-based proxy video codec 222 can be conditioned on additional encoding parameters, including target bit rate, for example, in order to predict distortions for a variety of different settings. NN-based proxy video codec 222 can predict either the final frame and distortion, or only the distortion itself. As noted above. NN-based proxy video codec 222 may be pre-trained offline and may be used in training pipeline system 210 for training of ML model-based video downsampler 211. Importantly, according to the codec rate distortion compensation solution disclosed by the present application, the effects of compression are included in the loss function used to train NN-based proxy video codec 222 in order to enable NN-based proxy video codec 222 to replicate the rate distortion characteristics of a standard codec. It is noted that during inference. i.e., at runtime, real video codec 114 is used in combination with trained ML model-based vide downsampler 112 to produce a backward-compatible compressed bitstream of $\mathcal{V}_{lr}$.

Loss Functions:

The choice of the loss function is very important, especially in a constrained setting where only the downsampling operation is optimized while the upsampling is fixed. In particular, it can be insightful to consider the following example; assume fixed upscaling on client device 140, in FIG. 1, is performed using nearest neighbor/box filter techniques for interpolation. In this case, independent of the downsampling technique used, the output generated on display 148 will appear pixelated, and an optimal downscale with regards to $L_2$ loss is given by averaging/box filtering.

The specific downsampler architecture would also not matter as long as it can compute an average, while improvements could only be produced by the loss function. Thus, to achieve more perceptually correct downsampling results, it is to necessary to optimize towards a loss function that better represents human vision.

However, because different losses might best represent different features of the human visual system, the solution disclosed herein adopts an objective function that combines multiple different perceptual loss functions while also considering rate as follows:

$$\mathcal{L} = \lambda \cdot \mathcal{R}(\mathcal{V}_{lr}) + \Sigma_{i=1}^{n} \omega_i \cdot \mathcal{L}_i(\mathcal{V}_{hr}, \mathcal{U}(\mathcal{V}_{lr}, 1/s))$$ (Equation 4)

Here, the weightings are a partition of unity ($\Sigma \omega_i = 1$) and the $\mathcal{L}_i$ are different perceptual losses, such as $L_1$, $L_2$, losses based on peak signal-to-Noise ratio (PSNR), structural similarity index measure (SSIM), learned perceptual image patch similarity (LPIPS) metric, deep image structure and texture similarity (DISTS) metric, or even generative adversarial network-based (GAN-based) losses. $\mathcal{R}(\mathcal{V}_{lr})$ is the estimated rate of lower resolution video sequence 250 accordingly to $\mathcal{P}$.

Thus, optimization block 260 of training pipeline system 210 may train ML model-based video downsampler 211 using training input video sequence 227, training output video sequence 228, and an objective function based on the estimated rate of lower resolution video sequence 250 and multiple perceptual loss functions. Moreover, in some implementations, as specifically shown by Equation 4 above, the objective function used to train ML model-based video downsampler 211 to provide trained ML model-based video downsampler 212 includes the estimated rate of lower resolution video sequence 250 in combination with a weighted sum of the multiple perceptual loss functions.

It is noted that $\mathcal{L}$ symbolizes upsampler 226 that upsamples lower resolution video sequence 250 to training output video sequence 228 having a display resolution greater than lower resolution video sequence 250, and which may have a display resolution substantially matching the display resolution of training input video sequence 227. It is further noted that in various implementations, upsampler 226 may be implemented as a fixed upsampler, or as an ML model-based learned upsampler. Moreover, in implementations in which upsampler 226 takes the form of an ML model-based upsampler. ML model-based upsampler 226 and ML model-based video downsampler 211 may be trained concurrently.

Temporal Coherence:

As noted above, when L>1, the input/output of trained ML model-based video downsampler 112 is a sequence of frames, which can be jointly considered in the objective function of Equation 4. Such an approach advantageously enables the enforcement of temporal stability on lower resolution video sequence 152 provided as an output of ML model-based video downsampler 112. As an example, the sequence of frames can be considered together to optimize temporal profiles, which favors temporally coherent downscaling results.

Figure 4:
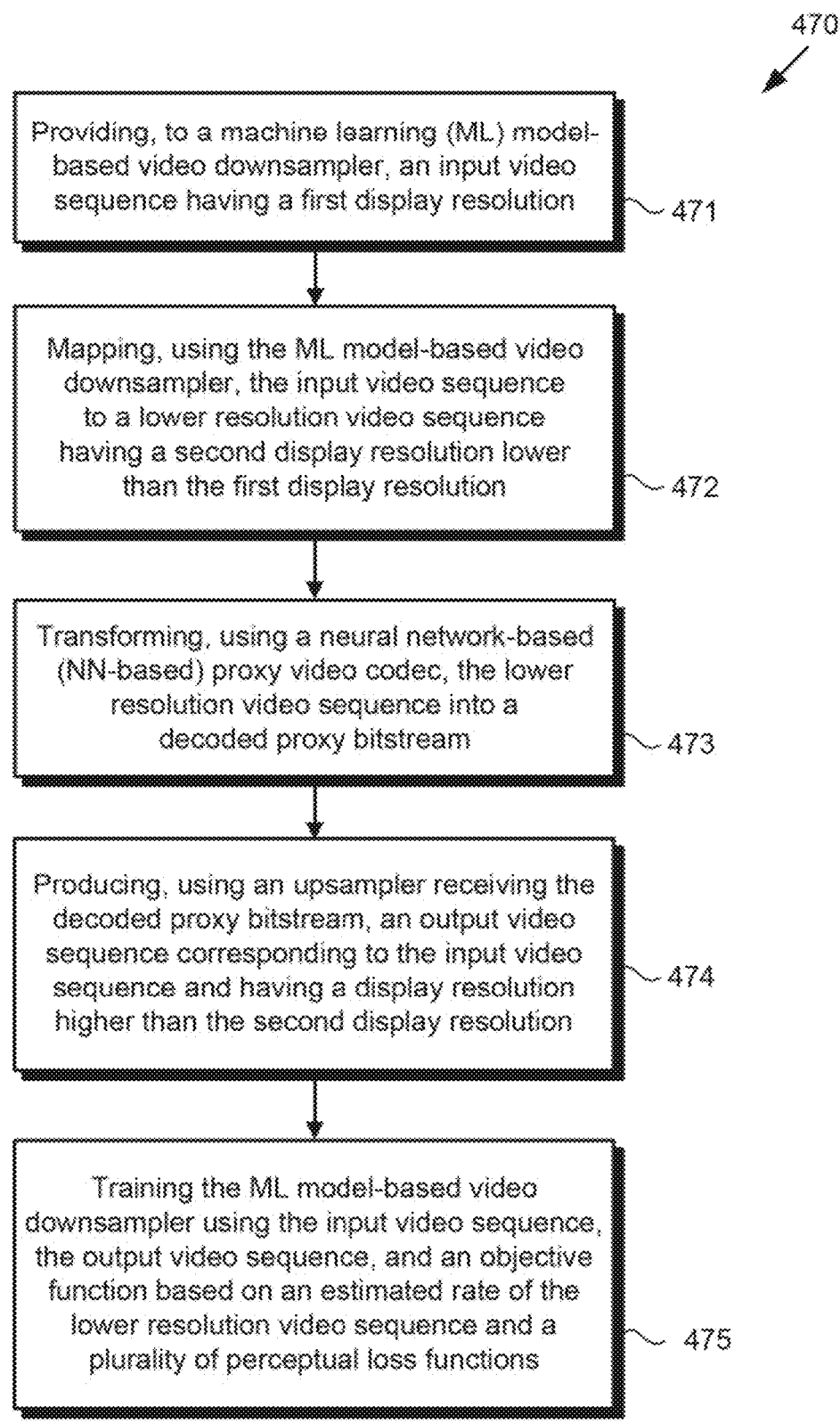
FIG. 4 shows a flowchart outlining an exemplary method for training an ML model-based codec rate distortion compensating downsampler, according to one implementation.

The functionality of training pipeline system 210 will be further described by reference to FIG. 4. FIG. 4 shows flowchart 470 presenting an exemplary method for use by video processing system 100 to train ML model-based video downsampler 211, according to one implementation. With respect to the method outlined in FIG. 4, it is noted that certain details and features have been left out of flowchart 470 in order not to obscure the discussion of the inventive features in the present application.

Referring now to FIG. 4 in combination with FIG. 2, flowchart 470 may begin with providing, to ML model-based video downsampler 211, an input video sequence (i.e., training input video sequence 227) having a first display resolution (action 471). Further referring to FIG. 1, training input video sequence 227 may be provided to ML model-based video downsampler 211 in action 471 by processing hardware 104 of computing platform 102.

Flowchart 470 also includes mapping, using ML model-based video downsampler 211, training input video sequence 227 to lower resolution video sequence 250 having a second display resolution lower than the first display resolution of training input video sequence 227 (action 472). Action 472 effectively maps a high resolution video sequence to a low resolution video sequence, and is performed by ML model-based video downsampler 211 under the control of processing hardware 104 of computing platform 102.

Flowchart 470 further includes transforming, using NN-based proxy video codec 222, lower resolution video sequence 250 into decoded proxy bitstream 224 (action 473). As noted above, NN-based proxy video codec 224 is pre-trained to replicate the rate distortion characteristics of video codec 114. Action 473 may be performed by processing hardware 104 of computing platform 102, using NN-based proxy video codec 222 of simulation module 220.

Flowchart 470 further includes producing, using upsampler 226 receiving decoded proxy bitstream 224, an output video sequence (i.e., training output video sequence 228) corresponding to training input video sequence 227 and having a display resolution higher than the second display resolution. i.e., higher than the display resolution of lower resolution video sequence 250 (action 474). In some implementations, the display resolution of training output video sequence 228 may be substantially the same display resolution as the first display resolution of training input video sequence 227. However, in other implementations, to the display resolution of training output video sequence 228, while greater than the second display resolution of lower resolution video sequence 240, may be lower than the first display resolution of training input video sequence 227. Action 474 may be performed by processing hardware 104 of computing platform 102, using upsampler 226 of simulation module 220.

Flowchart 470 further includes training ML model-based video downsampler 211 using training input video sequence 227, training output video sequence 228, and an objective function based on an estimated rate of the lower resolution video sequence and a plurality of perceptual loss functions (action 475). Action 475 may be performed using optimization block 260 of simulation module 220, under the control of processing hardware 104 of computing platform 102, in the manner described above by reference to Equation 4.

As noted above, the objective function expressed as Equation 4 includes the estimated rate of lower resolution video sequence 250 in combination with a weighted sum of multiple perceptual loss functions. In some implementations, the training of ML model-based video downsampler 211 may be further based on the respective weighting factors ($\omega_i$) applied to each perceptual loss function. Those weighting factors may be computed based on an initial optimization of the objective function expressed by Equation 4, may be selected by an administrator of training pipeline system 210, or may include both computed weighting factors and administrator selected weighting factors. In some implementations, the method outlined by flowchart 470 may further include providing those weighting factors as another input to ML model-based video downsampler 211 and training ML model-based downsampler 211 further using those weighting factor inputs. Thus, in some implementations. ML model-based video downsampler 211 is further configured to receive the weighting factors included in the weighted sum of the multiple perceptual loss functions included in Equation 4.

With respect to the method outlined by flowchart 470 and described above, it is noted that, in some implementations, actions 471, 472, 473, 474, and 475 may be performed in an automated process from which human participation may be omitted.

Figure 5A:
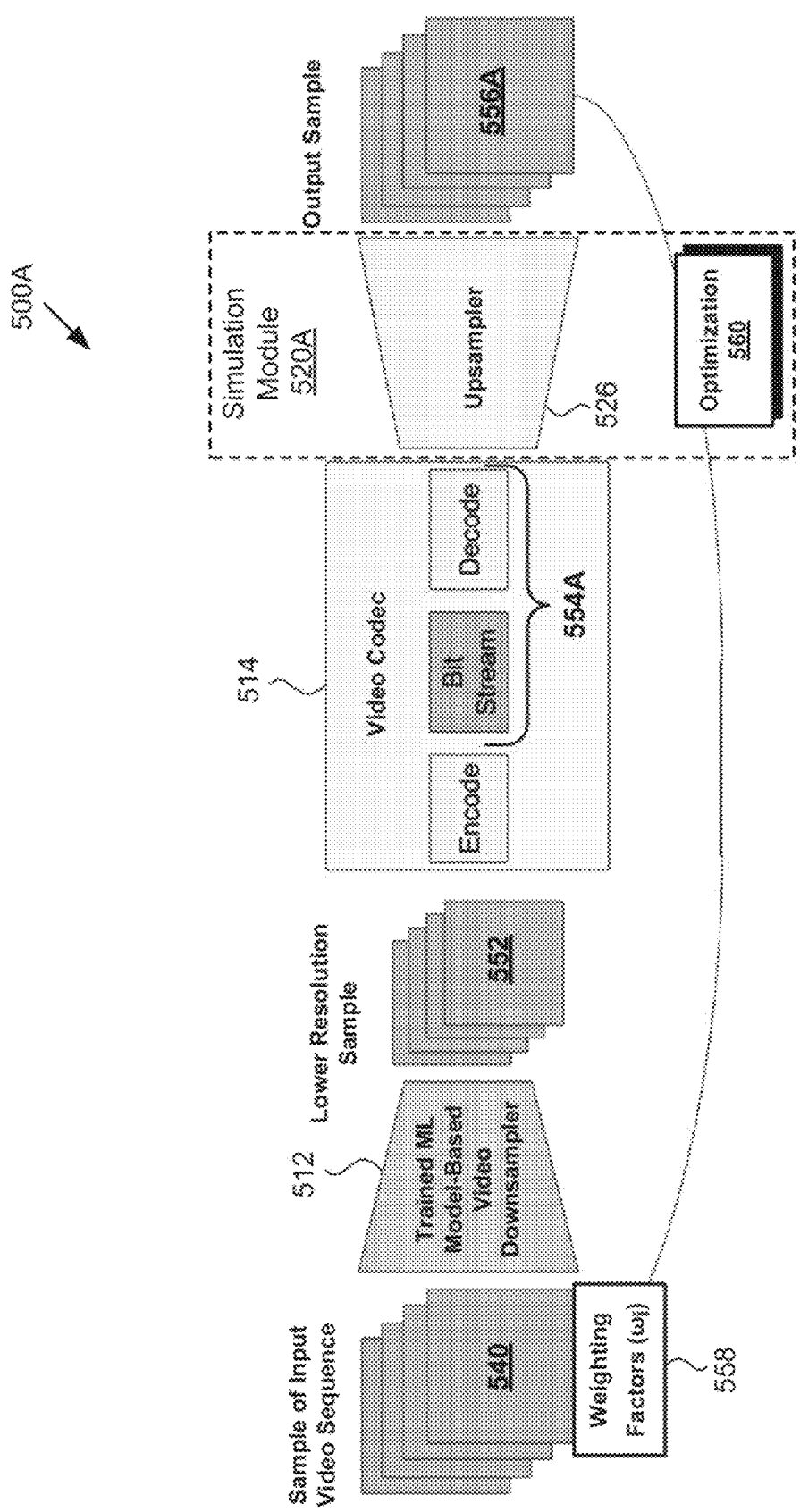
FIG. 5A shows a diagram depicting an exemplary conditional downsampling network implemented by the video processing system of FIG. 1, according to one aspect of the present concepts.

FIG. 5A shows a diagram depicting an exemplary conditional downsampling network implemented by video processing system 100 of FIG. 1, according to one aspect of the present concepts. As shown in FIG. 5A, conditional downsampling network 500A includes trained ML model-based video downsampler 512, video codec 514, and simulation module 520A including upsampler 526 and optimization block 560. Also shown in FIG. 5A are sample 540 of input video sequence 138 to video processing system 100, lower resolution sample 552 downsampled from sample 540, decoded bitstream 554A output by video codec 514, output sample 556A corresponding to input sample 540, and weighting factors 558.

Trained ML model-based video downsampler 512, video codec 514, and simulation module 520A correspond respectively in general to trained ML model-based video downsampler 112, video codec 114, and simulation module 120, in FIG. 1. Consequently, trained ML model-based video downsampler 512, video codec 514, and simulation module 520A may share any of the characteristics attributed to respective trained ML model-based video downsampler 112, video codec 114, and simulation module 120 by the present disclosure, and vice versa. In addition, upsampler 526 corresponds in general to upsampler 226, in FIG. 2, and may share any of the characteristics attributed to that corresponding feature above. That is to say, upsampler 526 may be implemented as a fixed upsampler, or as an ML model-based learned upsampler. Furthermore, weighting factors 558 correspond to the weighting factors applied to each of the perceptual loss functions included in Equation 4, which may be computed based on an initial optimization of the objective function of Equation 4, may be selected by an administrator of video processing system 100, or may include both computed weighting factors and administrator selected weighting factors.

Figure 5B:
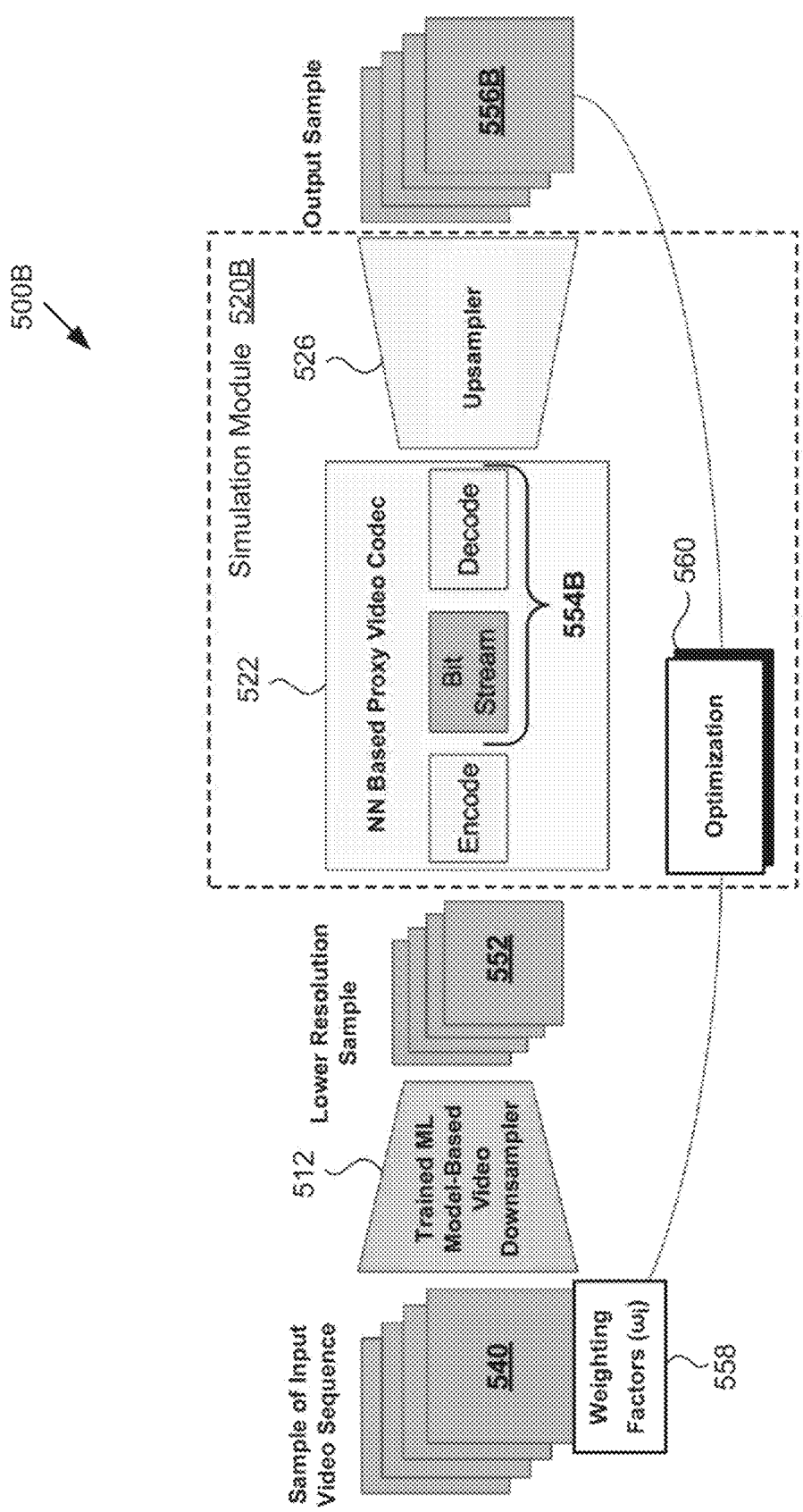
FIG. 5B shows a diagram depicting an exemplary conditional downsampling network implemented by the video processing system of FIG. 1, according to another aspect of the present concepts.

Referring to FIG. 5B. FIG. 5B shows a diagram depicting an exemplary conditional downsampling network implemented by video processing system 100 of FIG. 1, according to another aspect of the present concepts. As shown in FIG. 5B, conditional downsampling network 500B includes trained ML model-based video downsampler 512, and simulation module 520B including NN-based proxy video codec 522, upsampler 526, and optimization block 560. Also shown in FIG. 5B are sample 540 of input video sequence 138 to video processing system 100, lower resolution sample 552 downsampled from sample 540, decoded bitstream 554B output by proxy video codec 522, output sample 556B corresponding to input sample 540, and weighting factors 558.

It is noted that any features identified in FIG. 5B by reference numbers identical to reference numbers used in FIG. 5A correspond respectively to those previously identified features and may share any of the characteristics attributed to them above. Thus, trained ML model-based video downsampler 512, video codec 514, and simulation module 520A correspond respectively in general to trained ML model-based video downsampler 112, video codec 114, and simulation module 120, in FIG. 1, while weighting factors 558 correspond to the weighting factors applied to each of the perceptual loss functions included in Equation 4. Moreover. NN-based proxy video codec 522 corresponds in general to NN-based proxy video codec 222, in FIG. 2, and may share any of the characteristics attributed to that corresponding feature above. That is to say. NN-based proxy video codec 522 may be configured to replicate the rate distortion characteristics of video codec 114/514.

As shown by FIGS. 5A and 5B, in various implementations, simulation module 120/520A or 120/520B may include upsampler 526 or both NN-based proxy video codec 522 and upsampler 526.

With respect to conditional downsampling networks 500A and 500B, it is noted that those networks are trained to interpolate between loss functions and enable an administrator of video processing system 100 to control the degree of detail included in the downsampled video. In such a case, as shown in FIGS. 5A and 5B, trained ML model-based video downsampler 512 may also receive weighting factors 558. That is to say, in the present implementation, the downsampling algorithm employed by ML model-based video downsampler 512 is a function of weighting factors 558 as well as of $\mathcal{V}_{hr}$ and s:

$$\mathcal{D}(\mathcal{V}_{hr}, s, \omega)$$

To work properly in this conditional implementation, trained ML model-based video downsampler 512 should see a wide range of different loss weighting factors. e.g., randomly sampled loss weighting factors, during training. Conditional downsampling networks trained with random loss weighting factors are able to successfully interpolate between the perceptual loss functions during inference through human administrator controlled parameters. As will be discussed by reference to some of the specializations described below, the same parametric approach can also be used to have a single network trained for different upsamplers, different video codecs, different quantization parameters, and the like.

In some implementations, it may be advantageous or desirable for trained ML model-based video downsampler 112/512 of video processing system 100 to respond adaptively to the type of content included in input video sequence 138. Thus, in some implementations, before input video sequence 138 is mapped to lower resolution video sequence 152 by trained ML model-based video downsampler 112/512, processing hardware 104 may extract sample 540 of input video sequence 138, and may map, using trained ML model-based video downsampler 112/512, sample 540 to lower resolution sample 552. Processing hardware 104 may further, either using video codec 114/514 as shown in FIG. 5A, or using proxy video codec 522 as shown in FIG. 5B, transform lower resolution sample 552 into decoded bitstream 554A or 554B, and predict, using upsampler 526 and decoded sample bitstream 554A or 554B, output sample 556A or 556B corresponding to extracted sample 540. Processing hardware 104 may then modify, based on predicted output sample 556A or 556B, one or more parameters of trained ML model-based video downsampler 112/512, thereby advantageously rendering trained ML model-based video downsampler 112/512 content adaptive.

In addition to the perceptually-optimized downsampling framework discussed above, there are a number of specializations and extensions that the present novel and inventive approach supports, including:

Image-only downsampling: As noted above, as a specific use case, the present solution also enables perceptually-optimized downsampling for image codecs, when using an image only proxy codec and L=1.

Single-image/video downsampling: As a specific use case, trained ML model-based video downsampler 112/512 can be further optimized on a per-content basis by training a different network for each of different types of content.

Identity proxy codec: By using an identity proxy, perceptually-optimized downsampling can be supported without requiring the codec in training pipeline system 210.

Multiple output resolutions: The present solution can be easily adapted to support multiple output resolutions, which for instance may match those required by streaming services.

Optimal downsampling for learned super-resolution: As noted above, referring to FIG. 2, in some implementations, upsampler 226 can be a learned super-resolution upsampler. In that case, the super-resolution upsampler can also be end-to-end trained with ML model-based video downsampler 211.

Multiple quality levels and upsamplers: The framework of the present solution is flexible. On the one hand, it is possible to optimize downsampling for a specific codec setting and upsampler. Alternatively, it is also possible to train for a number of different codec settings and upsampling algorithms to achieve a single downsampling that is compatible with multiple different kinds of upsamplers and codec settings.

Parametric upsampling: Similar to the conditional downsampling discussed above, it is also possible to extend the approach disclosed in the present application to support multiple upsampling kernels.

Parametric codec: It is also possible to train a single downsampler and a single proxy codec network that is conditioned on different standard codecs.

Chroma Subsampling: To avoid unnecessary conversions and overhead, the video processing solution disclosed herein network can also operate on yuv420p or other content with chroma subsampling directly.

Pre-processing: Besides downsampling, there might be other preprocessing tasks that it would be beneficial to optimize. Note that if the downsampling factor=1, the present solution optimizes for mitigating compression artifacts.

Thus, the present application discloses systems and methods for training and utilizing a machine learning model-based codec rate distortion compensating downsampler that overcome the drawbacks and deficiencies in the art. The present solution advances the state-of-the-art in several ways. For example, in contrast to non-learned techniques, the present solution utilizes a data-driven approach to identify an optimal downsampling based on multiple perceptual loss functions. In contrast to existing learned approaches, none of which consider the codec during training, the present solution uses a proxy video codec pre-trained to replicate the rate distortion characteristics of a standard video codec. Compared to existing learned methods, the perceptually-optimized downsampler disclosed herein advantageously 1) supports more perceptual loss functions (e.g., LPIPS, DISTS, and temporal loss), 2) can provide subpixel-position-aware convolutions, 3) integrates a codec in the training loop, and 4) supports system administrator controllable parameters that enable fine-grained control on the basis of content type.

Moreover, the pre-trained proxy codec utilized in the present solution differs significantly from existing deep-learning based codecs, which generate artifacts that are very different from the ones produced by standard codecs. Thus, because the present solution utilizes a proxy codec pre-trained to reproduce the output of traditional codecs, the approach disclosed herein is advantageously better able to compensate for the distortions that are produced by such standard codecs.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
   an upsampler;
   a video codec;
   a trained machine learning (ML) model-based video downsampler trained using a neural network-based (NN-based) proxy video codec; and
   a processing hardware configured to:
   receive an input video sequence having a first display resolution;
   extract a content sample of the input video sequence;
   map, using the trained ML model-based video downsampler, the content sample to a lower resolution sample;
   transform, using one of the video codec or the NN-based proxy video codec, the lower resolution sample into a decoded sample bitstream;
   predict, using the upsampler and the decoded sample bitstream, an output sample corresponding to the content sample; and
   modify, based on the predicted output sample, one or more parameters of the trained ML model-based video downsampler;
   wherein the ML model-based video downsampler is trained using the input video sequence, the output sample, and an objective function based on an estimated rate of the lower resolution sample and a plurality of perceptual loss functions.

2. The video processing system of claim 1, wherein the NN-based proxy video codec is differentiable.

3. The video processing system of claim 1, wherein modifying the one or more parameters of the trained ML model-based video downsampler renders the trained ML model-based video downsampler content adaptive.

4. The video processing system of claim 1, wherein the trained ML model-based video downsampler is configured to support arbitrary scaling factors.

5. The system of claim 1, wherein the objective function comprises the estimated rate of the lower resolution sample in combination with a weighted sum of the plurality of perceptual loss functions.

6. The system of claim 5, wherein the ML model-based video downsampler is further configured to receive a plurality of weighting factors included in the weighted sum of the plurality of perceptual loss functions, and wherein the ML model-based video downsampler is trained further using the plurality of weighting factors.

7. The video processing system of claim 1, further comprising a simulation module including the upsampler.

8. The video processing system of claim 1, wherein the upsampler comprises an ML model-based upsampler.

9. The video processing system of claim 8, wherein the ML model-based upsampler and the ML model-based video downsampler are trained concurrently.

10. A method for use by a video processing system including an upsampler, a video codec, and a trained machine learning (ML) model-based video downsampler trained using a neural network-based (NN-based) proxy video codec, the method comprising:
    receiving an input video sequence having a first display resolution;
    extracting a content sample of the input video sequence;
    mapping, using the trained ML model-based video downsampler, the content sample to a lower resolution sample;
    transforming, using one of the video codec or the NN-based proxy video codec, the lower resolution sample into a decoded sample bitstream;
    predicting, using the upsampler and the decoded sample bitstream, an output sample corresponding to the content sample; and
    modifying, based on the predicted output sample, one or more parameters of the trained ML model-based video downsampler;
    wherein the ML model-based video downsampler is trained using the input video sequence, the output sample, and an objective function based on an estimated rate of the lower resolution sample and a plurality of perceptual loss functions.

11. The method of claim 10, wherein the NN-based proxy video codec is differentiable.

12. The method of claim 10, wherein modifying the one or more parameters of the trained ML model-based video downsampler renders the trained ML model-based video downsampler content adaptive.

13. The method of claim 10, wherein the trained ML model-based video downsampler is configured to support arbitrary scaling factors.

14. The method of claim 10, wherein the objective function comprises the estimated rate of the lower resolution sample in combination with a weighted sum of the plurality of perceptual loss functions.

15. The method of claim 14, wherein the ML model-based video downsampler is further configured to receive a plurality of weighting factors included in the weighted sum of the plurality of perceptual loss functions, and wherein the ML model-based video downsampler is trained further using the plurality of weighting factors.

16. The method of claim 10, wherein the upsampler is included in a simulation module.

17. The method of claim 10, wherein the upsampler comprises an ML model-based upsampler.

18. The method of claim 17, wherein the ML model-based upsampler and the ML model-based video downsampler are trained concurrently.

* * * * *